July 9, 1963

R. R. MacGREGOR 3,097,147

RECOVERY OF PROPARGYL ALCOHOL

Filed March 16, 1961

INVENTOR
ROB R. MAC GREGOR
BY
ATTORNEY

3,097,147
Patented July 9, 1963

3,097,147
RECOVERY OF PROPARGYL ALCOHOL
Rob R. MacGregor, Hopewell, Va., assignor to Allied Chemical Corporation, New York, N.Y., a corporation of New York
Filed Mar. 16, 1961, Ser. No. 96,179
7 Claims. (Cl. 202—42)

This invention relates to a process for recovering propargyl alcohol. It relates more particularly to a process whereby propargyl alcohol contained in solution in N-methyl-2-pyrrolidone or other N-alkyl-2-pyrrolidone having 2 to 8 N-alkyl carbon atoms can be effectively recovered as a substantially pure product in a simple manner.

An object of the present invention is to provide a process for the recovery of propargyl alcohol fom mixtures thereof with N-alkyl-2-pyrrolidones containing 1 to 8 carbon atoms in the N-alkyl radical.

Another object of the present invention is to provide a process for the effective recovery of propargyl alcohol in a simple manner from solutions thereof in N-methyl-2-pyrrolidone.

An additional object of the present invention is to provide a process for the separation and recovery of propargyl alcohol from solutions thereof in N-methyl-2-pyrrolidone or other N-alkyl-2-pyrrolidone containing 2–8 N-alkyl carbon atoms by a simple distillation procedure.

A further object of the present invention is to provide a method for the recovery and purification of propargyl alcohol from an aqueous solution of propargyl alcohol in N-methyl-2-pyrrolidone containing butynediol and formaldehyde, and especially from such a solution resulting from the ethynylation of formaldehyde by reaction with acetylene in the presence of a copper acetylide catalyst in aqueous N-methyl-2-pyrrolidone as reaction medium.

Other objects of the invention will in part be obvious and will in part appear hereinafter.

Propargyl alcohol is an unsaturated alcohol having the formula

HC≡C—CH₂OH

Known methods for preparing it involve ethynylation of formaldehyde by reaction with acetylene, preferably in a solvent and in the presence of a catalyst. Owing to the high reactivity of propargyl alcohol, the reaction product also contains 2-butyne-diol-1,4 as a by-product; thus:

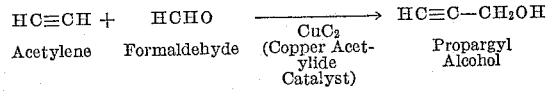

HC≡CH + HCHO $\xrightarrow{\text{CuC}_2}$ HC≡C—CH₂OH
Acetylene  Formaldehyde  (Copper Acetylide Catalyst)  Propargyl Alcohol

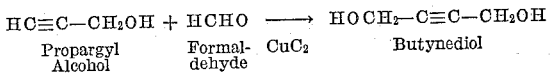

HC≡C—CH₂OH + HCHO $\xrightarrow{\text{CuC}_2}$ HOCH₂—C≡C—CH₂OH
Propargyl Alcohol  Formaldehyde  Butynediol An improved process for the synthesis of propargyl alcohol from acetylene and formaldehyde is disclosed in my joint application with William P. Moore, Serial No. 847,223, filed October 19, 1959. According to said improved process, a markedly high production rate of propargyl alcohol and a favorable propargyl alcohol: butynediol ratio is obtained at relatively low operating pressures by carrying out the reaction of acetylene with formaldehyde in the liquid phase in admixture with an N-alkyl-2-pyrrolidone and water, the concentration of water preferably being 14% to 20% by weight and the pyrrolidone having 1 to 8 N-alkyl carbon atoms. The reaction mixtures resulting from such a process contain propargyl alcohol, butynediol, N-alkyl pyrrolidone, unreacted formaldehyde, water, catalyst (when employed), and unreacted acetylene. For example, after removal of the catalyst and unreacted acetylene, a typical reaction mixture (resulting from the reaction of acetylene with a mixture of formaldehyde and aqueous N-methyl-2-pyrrolidone containing about 63% of methyl-pyrrolidone, about 18% of water, and about 5% of a suspension of 20% copper acetylide on silica catalyst, all by weight, at a temperature of 135° C. and 150 p.s.i.g. pressure) had the following composition:

| Component— | Weight percent |
|---|---|
| Propargyl alcohol | 8.82 |
| Butynediol | 2.97 |
| Formaldehyde | 5.82 |
| Water | 17.1 |
| N-methyl-2-pyrrolidone | 65.1 |
| Cuprene | 0.14 |

The recovery of propargyl alcohol from its mixtures with N-alkyl-2-pyrrolidones containing 1 to 8 carbon atoms in the N-alkyl radical, and especially from mixtures of the above type, presents a number of difficulties particularly in connection with the obtainment of a purified product.

If it is attempted to recover the propargyl alcohol by distillation, the results are very unsatisfactory owing to the fact that the N-alkyl pyrrolidone prevents the distillation of a water-propargyl alcohol azeotrope. Moreover, if it is attempted to dehydrate the mixture by azeotropic distillation with the aid of an added liquid such as benzene, only the water is removed, leaving an anhydrous solution of propargyl alcohol in the N-alkyl-pyrrolidone from which the propargyl alcohol cannot be readily separated.

Extractive methods of recovering the propargyl alcohol are also inoperative because the usual extractants (for example, ethyl acetate) are miscible with the other components.

According to the present invention, it has been found that high recoveries of propargyl alcohol from mixtures thereof with N-alkyl-2-pyrrolidones of the above class can be obtained by distillation of said mixtures, provided water is present in the mixture subjected to distillation in amounts of at least 25% and preferably at least 30% by weight. I have discovered that recoveries of propargyl alcohol in the overhead distillate exceeding 97% by weight can be obtained when the mixture of propargyl alcohol and N-alkyl-pyrrolidone subjected to distillation contains at least 30% of water by weight; whereas recoveries of less than 43% by weight of propargyl alcohol are obtained when said mixture contains less than 25% of water by weight.

While I do not wish to be limited to any theoretical considerations, it is postulated that a weak chemical bond between the N-alkyl-pyrrolidone and propargyl alcohol causes a negative deviation from Raoult's law which makes the separation of the components by distillation difficult, if not impossible. The addition of water in amounts giving a concentration of at least 25% and preferably at least 30%, by weight, serves to counteract this effect and permits distillation of a water-propargyl alcohol azeotrope from which the propargyl alcohol can be readily recovered in anhydrous form and further purified in the known manner; for example, by removal of water by azeotropic distillation with a suitable liquid (e.g., isopropyl ether, cyclohexane, ethyl propyl ether or benzene), followed by vacuum distillation of the propargyl alcohol.

In order to avoid unnecessary dilution of the propargyl alcohol recovered as overhead distillate in the initial distillation, the amount of water added to the mixture subjected to distillation is preferably kept within reasonable limits. Thus, the concentration of water in the mixture generally does not exceed 45% by weight. By employing a concentration of water ranging from 30% to 35% by weight, substantially complete recovery of the propargyl alcohol can be obtained in the form of an aqueous distillate containing 14% or more by weight of propargyl alcohol.

In the drawings, FIG. 1 is a diagrammatic flow diagram showing a preferred process for carrying out the recovery and purification of propargyl alcohol contained in a mixture of the type referred to above.

For purposes of illustration, the mechanics of the process of this invention will be described in detail in connection with the recovery of propargyl alcohol from an aqueous mixture of propargyl alcohol and N-methyl-2-pyrrolidone containing by-product butynediol and unreacted formaldehyde and resulting from the ethynylation of formaldehyde by reaction with acetylene in the presence of a copper acetylide catalyst in aqueous N-methyl-2-pyrrolidone as reaction medium.

The invention is not limited thereto, since other mixtures of propargyl alcohol and N-methyl-2-pyrrolidone and mixtures produced in other ways, as well as mixtures of propargyl alcohol with other N-alkyl-2-pyrrolidones containing 1 to 8 carbon atoms in the N-alkyl radical, may be treated in similar manner to recover the propargyl alcohol.

Figure 1:
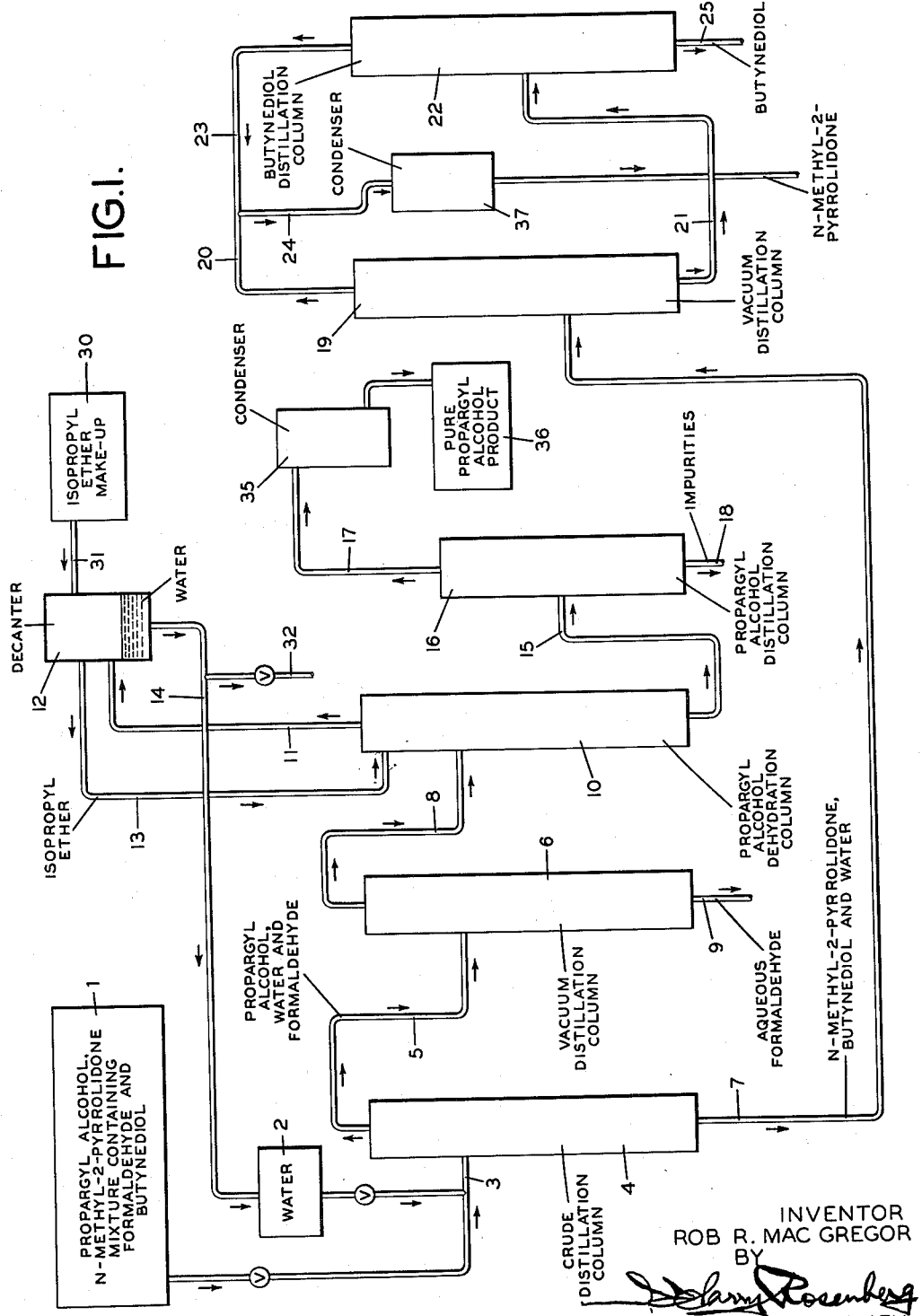

A process for recovering propargyl alcohol, in accordance with the present invention, from a mixture of the type referred to above is diagrammatically illustrated in FIG. 1 of the drawings. In accordance therewith, an aqueous liquid solution of about 1 part of propargyl alcohol in about 7 parts of N-methyl-2-pyrrolidone and about 2 parts of water, and containing about 0.3 part of by-product butyne-2-diol-1,4 and about 0.6 part of formaldehyde is fed in carefully controlled amounts from storage tank 1 simultaneously with a carefully controlled feed of water from storage tank 2 to feed line 3, so as to form a solution containing about 30% of water. (All parts and percentages are by weight, unless otherwise stated.) This carefully controlled aqueous solution is passed through feed line 3 to a crude distillation column 4 operated at atmospheric pressure. With the column feed containing about 30% of water, all of the propargyl alcohol is taken off as overhead distillate along with water and unreacted formaldehyde, and the N-methyl-2-pyrrolidone and by-product butynediol remain in the bottoms. The overhead distillate is fed through line 5 to a continuous propargyl alcohol-water vacuum distillation column 6 operated at 20 mm. Hg pressure, from which aqueous propargyl alcohol is removed as overhead distillate and led, by line 8, to a propargyl alcohol dehydration column 10. Water is removed by azeotropic distillation in column 10 in the form of a water-isopropyl ether azeotrope which passes overhead through line 11 and is separated in decanter 12, a part of the water being returned as required for reuse through line 14 to water storage 2 and the excess being discharged through line 32. Isopropyl ether is returned to the column through line 13 and additional isopropyl ether is supplied as make-up to the decanter from storage 30 through line 31.

Aqueous formaldehyde is removed from the bottom of column 6 through line 9. It can be returned to the ethynylation reactor for reuse or sent to a formaldehyde recovery system, if desired.

Dehydrated propargyl alcohol is withdrawn from the bottom of column 10 through line 15 and is further purified by vacuum distillation in distillation column 16, operated at 150 mm. Hg pressure. Pure propargyl alcohol is taken off as overhead through line 17, condensed in condenser 35, and collected in receiver 36. A bottom cut of impurities is discharged from column 16 through line 18.

The bottom cut obtained in crude distillation column 4, and comprising the N-methyl pyrrolidone, butynediol, water and impurities, is removed via line 7. When it is desired to recover the butynediol and the N-methyl pyrrolidone separately, the cut is subjected to vacuum distillation in a column 19, operated at 40 mm. Hg pressure, wherein the N-methyl pyrrolidone is removed overhead as vapor through lines 20 and 24 and condensed in condenser 37.

The bottom cut of impure butynediol obtained in column 19 is passed via line 21 into a vacuum distillation column 22 operated at 10 mm. Hg pressure from which residual N-methyl pyrrolidone is removed as overhead vapor through line 23 and passed to condenser 37 through line 24.

The bottom cut of butynediol is removed from column 22 through line 25.

Figure 2:
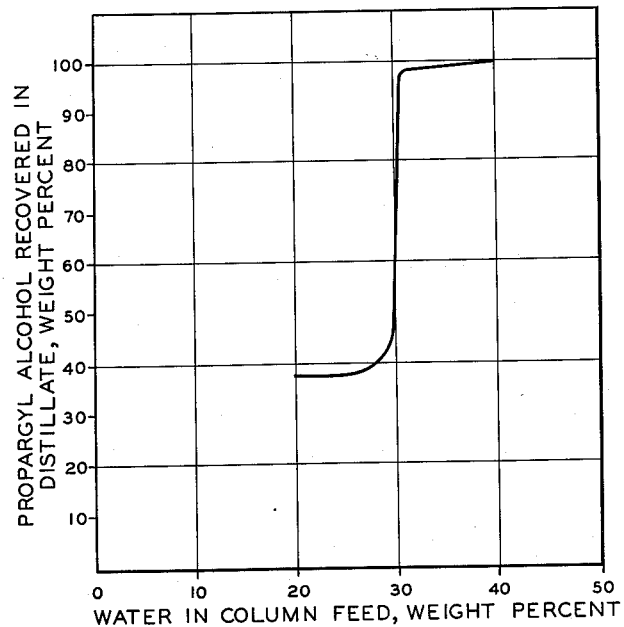
FIG. 2 is a curve showing the effect of the concentration of water in the mixture subjected to distillation upon the recovery of propargyl alcohol in the overhead distillate.
Figure 3:
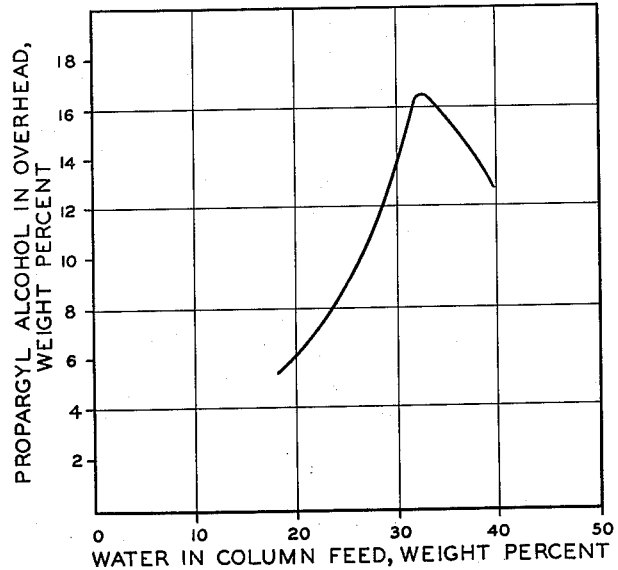
FIG. 3 is a curve showing the effect of the concentration of water in the mixture subjected to distillation upon the concentration of propargyl alcohol in the overhead distillate.

The curves in FIGS. 2 and 3, showing the effect of various concentrations of water in the aqueous solutions of propargyl alcohol in N-methyl-2-pyrrolidone subjected to distillation, are based on data obtained by subjecting an aqueous solution of propargyl alcohol in N-methyl-2-pyrrolidone, containing about 0.3 part of butyne-2-diol-1,4, about 0.6 part of formaldehyde, per part of propargyl alcohol, and various amounts of water, to distillation at atmospheric pressure in a packed column 12 feet long, having an inside diameter of 4 inches, and packed with 0.5 inch ring packing material. The column was operated with 9 ft. as a stripping section and 3 ft. as a rectifying section, the reflux ratio being 1:1. The feed solution, which was introduced at the junction of said sections, contained 5.1–6.5% of propargyl alcohol and was fed at the rate of 3050 to 3470 gm./hr. The overhead temperature was 106°–108° C. The pot temperature was 167°–174° C.

FIG. 2 shows the curve obtained by plotting the per cent by weight of propargyl alcohol recovered in the overhead distillate vs. percent by weight of water in the solution fed to the column.

FIG. 3 shows the curve obtained by plotting the per cent by weight of propargyl alcohol contained in the overhead distillate vs. percent by weight of water in the solution fed to the column.

As is evident from FIGS. 2 and 3, the percentage of propargyl alcohol recovered in the distillate rises rapidly to nearly 100% when the water concentration reaches about 30%, and the concentration of propargyl alcohol in the distillate reaches a maximum between a water concentration of 30% and 35% in the solution fed to the column.

The invention will be illustrated by the following specific example, but it is to be understood that it is not limited to the details thereof and that changes may be made without departing from the scope of the invention. The temperatures are in degrees centigrade and the parts and percentages are by weight.

*Example*

A liquid ethynylation product resulting from the reaction of acetylene with a mixture of formaldehyde and aqueous N-methyl-2-pyrrolidone containing about 63% of methylpyrrolidone, about 18% of water, and about 5% of a suspension of 20% copper acetylide on silica catalyst, all by weight, at a temperature of 135° C. and 150 p.s.i.g. pressure, and having the composition set out in column 2, was mixed with water recycled from decanter 12 to give a feed to distillation column 4 having the following composition:

| Component— | Percent |
|---|---|
| Propargyl alcohol | 7.49 |
| Butynediol | 2.48 |
| Formaldehyde | 5.02 |
| Water | 30.34 |
| N-methyl-2-pyrrolidone | 54.40 |
| Cuprene | 0.12 |
| Isopropyl ether | 0.15 |

The column was operated at atmospheric pressure, a head temperature of 106° to 109°, and a bottom temperature of 167° to 174°. The distillation at 106°–109° had the following composition:

| Component— | Percent |
|---|---|
| Propargyl alcohol | 17.59 |
| Formaldehyde | 12.18 |
| Water | 69.86 |
| Isopropyl ether | 0.37 |

The bottom cut at 167° had the following composition:

| Component— | Percent |
|---|---|
| N-methyl-2-pyrrolidone | 91.41 |
| Butynediol | 4.17 |
| Propargyl alcohol | 0.61 |
| Formaldehyde | 0.16 |
| Water | 3.45 |
| Cuprene | 0.20 |

The distillate was fed to the propargyl alcohol-water distillation column 6, operated at 20 mm. Hg absolute pressure with a pot temperature of 36–42°. An overhead stream was removed with the following composition:

| Component— | Percent |
|---|---|
| Propargyl alcohol | 27.23 |
| Formaldehyde | 0.72 |
| Water | 71.48 |
| Other | 0.57 |

The bottom cut contained about 36% formaldehyde. If desired, it can be concentrated to a 50% aqueous solution by distillation and returned to the synthesis system for reuse.

The overhead from column 6 was fed to the propargyl alcohol dehydration column 10 where the water was removed as a water-isopropyl ether azeotrope at 62° at atmospheric pressure. Isopropyl ether was continuously decanted from the water and returned to the stillhead. A portion of the decanted water was returned to the water feed 2 and the remainder was discarded. It was necessary to add 0.03 lb. isopropyl ether/lb. propargyl alcohol recovered to make up for bleed losses.

The discolored propargyl alcohol discharged from the dehydration column 10 through line 15 had the following composition:

| Component— | Percent |
|---|---|
| Propargyl alcohol | 96.0 |
| Water | 0.3 |
| Formaldehyde | 0.3 |
| Other | 3.4 |

This solution was sent to the pure propargyl alcohol distillation column 16, operated at 100 mm. Hg absolute pressure, and a pot temperature of 85° to 90°. The pure product was recovered as a clear distillate at 63–64° with the following composition:

| Component— | Percent |
|---|---|
| Propargyl alcohol | 99.50 |
| Water | 0.44 |
| Other | 0.06 |

The bottom cut at 87°, which was withdrawn through line 18 and which contained about 50% heavies and 50% alcohol, was discarded.

Overall recovery of propargyl alcohol was 93%.

The residue from the crude distillation column 4 was fed to the solvent recovery column 19, operated at 40 mm. Hg absolute pressure, where 95% of the N-methyl-2-pyrrolidone was recovered as distillate at 115° having the following composition:

| Component— | Percent |
|---|---|
| N-methyl-2-pyrrolidone | 95.37 |
| Water | 3.79 |
| Propargyl alcohol | 0.67 |
| Formaldehyde | 0.17 |

The residue removed through line 21, and which had the following composition:

| Component— | Percent |
|---|---|
| Butynediol | 46.84 |
| N-methyl-2-pyrrolidone | 50.88 |
| Cuprene | 2.28 | was fed to the butynediol distillation column 22, operated at 10 mm. Hg absolute pressure, an overhead temperature of 85° to 92° and a bottoms temperature of 150° to 160°, where the remaining N-methyl-2-pyrrolidone was removed as distillate at 89° and combined with the distillate from column 19. If desired, it can be recycled to the synthesis system for reuse.

The residue from the butynediol column 22 at 158°, which had the composition:

| Component— | Percent |
|---|---|
| Butynediol | 95.36 |
| Cuprene | 4.64 | was fed to a cuprene-precipitation tank, where it was mixed with water at room temperature. The aqueous butynediol-cuprene slurry was fed to a perforate bowl centrifuge which separated cuprene-rich material from an aqueous butynediol product in the form of a clear aqueous solution containing 21.96% of butynediol. Overall butynediol recovery was 93%.

The process may be carried out with various mixtures of propargyl alcohol and N-alkyl pyrrolidone. Preferably the mixture contains 2 to 30 parts of propargyl alcohol per 100 parts of N-alkyl pyrrolidone. Dilute aqueous mixtures of propargyl alcohol and N-alkyl pyrrolidone containing more than 45%, and preferably more than 35%, by weight, of water may be subjected to a preliminary azeotropic distillation with benzene, cyclohexane, ethyl propyl ether, or isopropyl ether, to reduce the amount of water in the mixture, if desired.

Propargyl alcohol can be recovered by distillation in accordance with the present invention from admixtures with various N-alkyl-2-pyrrolidones having 1 to 8 N-alkyl carbon atoms, that is, derivatives of 2-pyrrolidone in which the hydrogen atom normally linked to the nitrogen atom is substituted by an open-chain saturated hydrocarbon radical having 1 to 8 carbon atoms in a straight or branched carbon chain.

It is a feature of the present invention that the recovery and purification of the propargyl alcohol contained in solution in N-alkyl-2-pyrrolidone having 1 to 8 N-alkyl carbon atoms by distillation in accordance with the process of the invention can be carried out in a continuous manner, as shown in FIG. 1 of the drawings, although batch distillation processes can be employed if desired. Another advantage of the present invention is the high degree of separation of components effected by the process. Thus, it becomes feasible to combine the separation and purification process of the present invention with the ethynylation process of application Serial No. 847,223, referred to above, and to return the formaldehyde and N-alkyl pyrrolidone, recovered in the recovery and purification process of the present invention, to the ethynylation process for reuse in the latter process.

I claim:
1. A process for recovering propargyl alcohol from a mixture containing it together with an N-alkyl pyrrolidone having 1 to 8 N-alkyl carbon atoms, which comprises subjecting said mixture to distillation in the form of an aqueous mixture containing at least 25% by weight of water.

2. A process as defined in claim 1 wherein the aqueous mixture contains at least 30% by weight of water.

3. A process as defined in claim 1 wherein the aqueous mixture contains 30%–45% by weight of water.

4. A process for recovering propargyl alcohol from an aqueous solution of propargyl alcohol in N-methyl-2-pyrrolidone which comprises adjusting the concentration of water in the solution to at least 25% by weight, distilling the aqueous solution, and collecting a distillate of aqueous propargyl alcohol.

5. A process for recovering propargyl alcohol from an aqueous solution of propargyl alcohol in N-methyl-2-pyrrolidone containing butynediol and formaldehyde, which comprises adjusting the concentration of water in the solution to 25%–45% by weight, separating the resulting solution by distillation into an overhead portion containing propargyl alcohol, water and formaldehyde, and a bottoms portion containing N-methyl-2-pyrrolidone butynediol and water, and recovering propargyl alcohol from the overhead portion.

6. A process as defined in claim 5 wherein the concentration of water in the aqueous solution of propargyl alcohol and N-methyl-2-pyrrolidone is adjusted to 30%–35% by weight.

7. A process of recovering propargyl alcohol from a solution of propargyl alcohol in N-methyl-2-pyrrolidone containing butynediol and formaldehyde, and resulting from the ethynylation of formaldehyde by reaction with acetylene in aqueous N-methyl-2-pyrrolidone as reaction medium, which comprises subjecting the solution to distillation in the form of an aqueous mixture containing 25%–45% of water, by weight, separating an overhead distillate containing propargyl alcohol, water and formaldehyde from a bottom cut containing N-methyl-2-pyrrolidone, butynediol and water, and recovering propargyl alcohol from the overhead distillate by distillation.

References Cited in the file of this patent
UNITED STATES PATENTS

| | | |
|---|---|---|
| 2,232,867 | Reppe et al. | Feb. 25, 1941 |
| 2,527,358 | Fahnoe | Oct. 24, 1950 |
| 2,551,593 | Gilliand et al. | May 8, 1951 |

FOREIGN PATENTS

| | | |
|---|---|---|
| 522,633 | Canada | Mar. 13, 1956 |